UNITED STATES PATENT OFFICE.

FRANZ GUSTAV KLEINSTEUBER, OF PANKOW-BERLIN, GERMANY.

COMPOUND FOR DISSOLVING RESINS.

SPECIFICATION forming part of Letters Patent No. 656,252, dated August 21, 1900.

Original application filed November 9, 1899, Serial No. 736,403. Divided and this application filed May 3, 1900. Serial No. 15,396. (No specimens.)

*To all whom it may concern:*

Be it known that I, FRANZ GUSTAV KLEINSTEUBER, a subject of the Grand Duke of Saxe-Weimar, residing at Pankow-Berlin, Germany, have invented certain new and useful Improvements in a Compound for Dissolving Resins; and I do hereby declare the following to be a full, clear, and exact description of the invention, such as will enable others skilled in the art to which it appertains to make and use the same.

In the manufacture from resins of a plastic material adapted to be molded or otherwise shaped to any desired form which will harden on drying it is of course necessary to dissolve the resinous material. It is well known that by means of the solvents generally employed many species of resins can only be incompletely dissolved, and this with great difficulty—as, for instance, the copals—yet these very resins are particularly well adapted for the manufacture of the material referred to, owing to their peculiar character and specific properties.

My invention has for its object to provide an improved and useful compound to be used with solvents in the manufacture of products from resins of a plastic material whereby the difficulties referred to are obviated and a complete solution of the resin readily effected, while the quality of the final product is materially enhanced. To these ends I add to the resin solvent usually employed or a solution of resin a suitable quantity of a compound which, in conjunction with said solvent, readily and completely dissolves the resin and imparts to the final product properties not possessed by similar products as heretofore manufactured.

In carrying out my invention I prepare a compound consisting of a solution of dammar and tung or wood-oil in benzole and oil of turpentine, and of this I add to the resin solvent or to the resin solution a quantity equal to from one to twenty per cent. of the resin, according to the nature thereof. The properties of this compound may be materially enhanced by the addition to the compound of oil of rosemary.

In practice I preferably prepare the compound as follows: I dissolve, say, three par of dammar in five parts of oil of turpentin I then mix fifty parts of tung or wood-o twenty-three parts of benzole, and five par of oil of turpentine and mix the same wi the solution of dammar, and a suitable qua tity of this compound in about the propc tions above stated is mixed with the resin sc vent—as benzole, alcohol, oil of turpentin or the like—and to this I add the resin to l dissolved while stirring the same and he the mixture to a temperature of from 40° 50° centigrade until the solution is complete and, as above stated, I may, and, in fact, prefer to, add to the compound of damma tung oil, benzole, and oil of turpentine abo' given about two parts of oil of rosemar This, however, I prefer to add after the mi ture has been brought to the temperature r ferred to, though it may be added before at any stage before the composition has thic ened.

Furthermore, and as heretofore stated, may first prepare a solution of the resin any usual solvent, so far as this can be don and then add thereto a suitable quantity the compound and proceed as above d scribed.

If a filler—such as asbestos, mica, or tl like—is to be mixed with the material, tl compound may be added to the resin solutic after the admixture therewith of such fill or before, as may be desired.

It will be understood that I do not lim myself to the exact proportions of the cor pounds of dammar, tung, or wood-oil, oil turpentine, and oil of rosemary, as these me be varied within certain limits, though I ha\ found that the proportions given produce e: cellent results. I have also found that if tl composition of matter obtained as above d scribed is allowed to stand from twenty-fot to forty-eight hours a better final product obtained.

By the compound described the slimy cor stituents of the resins, which are of the grea est importance to the final product, are con pletely dissolved and become intimately iı corporated in the mass, and, as will be readil understood, the manufacture of materia such as referred to from resins is greatly facilitated and expedited, while the final product is superior in every respect to like products as heretofore made in that the compound added to the resin solvent or resin solution not only results in the complete dissolution of the same, but in that a more homogeneous, tough, and solid product is obtained, the brittleness of which is reduced to a minimum, while the physical properties of the tung or wood-oil, irrespective of its great superiority to linseed-oil as a dryer, have a very material influence on the final product, so that the latter is especially adapted to the manufacture of bodies or objects subjected to shock or jarring, hence to the use of such final products as electrotechnical insulations.

Having thus described my invention, what I claim as new therein, and desire to secure by Letters Patent, is—

1. A compound to be used with solvents for resins consisting of a solution of dammar, tung or wood-oil, benzole and oil of turpentine in about the proportions set forth.

2. A compound to be used with solvents for resins consisting of a solution of dammar and tung or wood-oil in benzole and oil of turpentine and oil of rosemary in about the proportions set forth.

In testimony that I claim the foregoing as my invention I have signed my name in presence of two subscribing witnesses.

FRANZ GUSTAV KLEINSTEUBER.

Witnesses:
MAX. C. STACHLER,
HENRY HASPER.